(12) United States Patent
Chen et al.

(10) Patent No.: US 7,542,277 B2
(45) Date of Patent: Jun. 2, 2009

(54) MOUNTING APPARATUS FOR DATA STORAGE DEVICE

(75) Inventors: Yun-Lung Chen, Tu-Cheng (TW); Da-Long Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 383 days.

(21) Appl. No.: 11/265,415

(22) Filed: Nov. 2, 2005

(65) Prior Publication Data
US 2006/0187632 A1    Aug. 24, 2006

(30) Foreign Application Priority Data
Dec. 21, 2004    (CN)    .................... 2004 2 0103389 U

(51) Int. Cl.
*H05K 7/12*    (2006.01)
(52) U.S. Cl. .................... 361/685; 361/726; 248/221.11
(58) Field of Classification Search ................. 361/685, 361/726; 248/221.11
See application file for complete search history.

(56) References Cited

U.S. PATENT DOCUMENTS

| 6,556,434 | B1 | 4/2003 | Chan et al. |
| 6,654,240 | B1 * | 11/2003 | Tseng et al. ................. 361/685 |
| 7,085,131 | B2 * | 8/2006 | Peng et al. .................... 361/685 |
| 7,336,482 | B2 * | 2/2008 | Chen et al. .................... 361/685 |
| 7,363,640 | B2 * | 4/2008 | Wang et al. ................. 720/657 |

\* cited by examiner

*Primary Examiner*—Lisa Lea-Edmonds
*Assistant Examiner*—Ingrid Wright

(57) ABSTRACT

A mounting apparatus for a data storage device (10) with mounting holes (111) in a side wall (11) includes a bracket (20) and a locking member (30). A resilient clip (222) extends from the bracket. An operating portion (2222) protrudes from a free end of the resilient clip. A retaining tab (2221) protrudes from the free end of the resilient clip for engaging into the mounting hole of the data storage device. The locking member is slidably secured to the bracket, and a pushing portion (34) is formed in the locking member for lifting the operating portion to disengage the retaining tab from the mounting hole of the data storage device.

18 Claims, 7 Drawing Sheets

MOUNTING APPARATUS FOR DATA STORAGE DEVICE

BACKGROUND OF THE INVENTION

1. Field of the Invention

The present invention relates to mounting apparatuses, more particularly to a mounting apparatus for conveniently securing a data storage device into a computer enclosure and later removing therefrom.

2. General Background

Usually, a storage device is simply screwed to a bracket of a computer enclosure. This conventional mounting method substantially wastes time, and adds complexity and difficulty of assembling the storage device to the computer enclosure and later disassembling therefrom.

A conventional disk drive mounting structure without using screws includes a case. The case has positioning units disposed in two opposite sidewalls thereof at different elevations. A plurality of carrier plates is respectively hooked in the positioning units and adapted for holding disk drives in the case at different elevations. A plurality of holding down frames is respectively pivoted to the positioning units at one side wall of the case and adapted for holding down the corresponding disk drives on the carrier plates. A plurality of locking handles is respectively pivoted to the positioning units at one side wall of the case and adapted for locking the holding down frames and the disk drives. However, so many elements are needed in the mounting apparatus described above that will increase assembly time.

What is needed, therefore, is to provide a mounting apparatus which secures data storage devices conveniently.

SUMMARY

A mounting apparatus for a data storage device with mounting holes in a side wall includes a bracket and a locking member. A resilient clip extends from the bracket. An operating portion protrudes from a free end of the resilient clip. A retaining tab protrudes from the free end of the resilient clip for engaging into the mounting hole of the data storage device. The locking member is slidably secured to the bracket, and a pushing portion is formed in the locking member for lifting the operating portion to disengage the retaining tab from the mounting hole of the data storage device.

Advantages and novel features of the present invention will be drawn from the following detailed description of preferred embodiment with attached drawings, in which:

DETAIL DESCRIPTION OF PREFERRED EMBODIMENT

Figure 1:
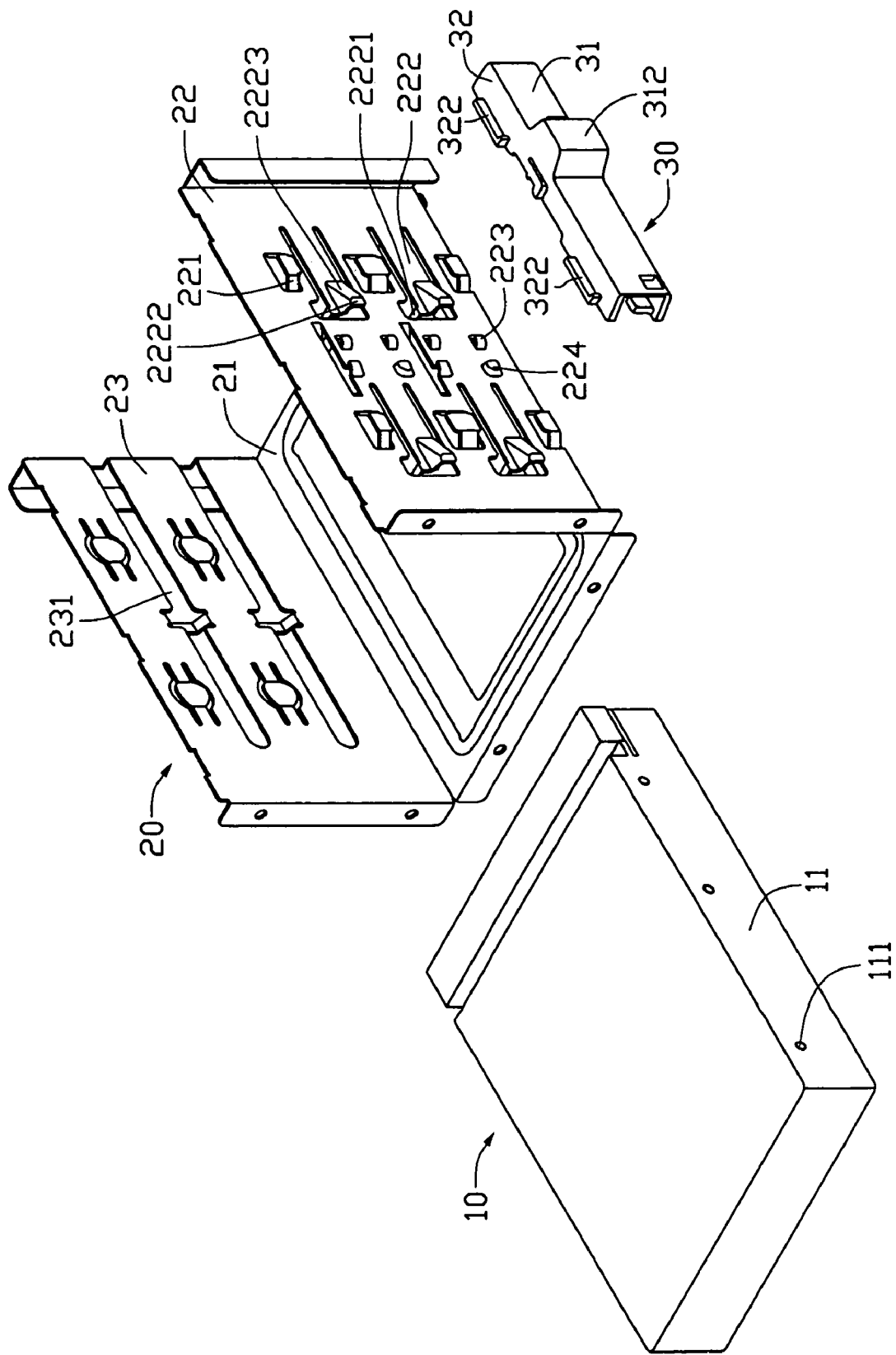
FIG. 1 is an exploded, isometric view of a mounting apparatus and a data storage device of a preferred embodiment of the present invention, the mounting apparatus including a bracket and a locking member.
Figure 2:
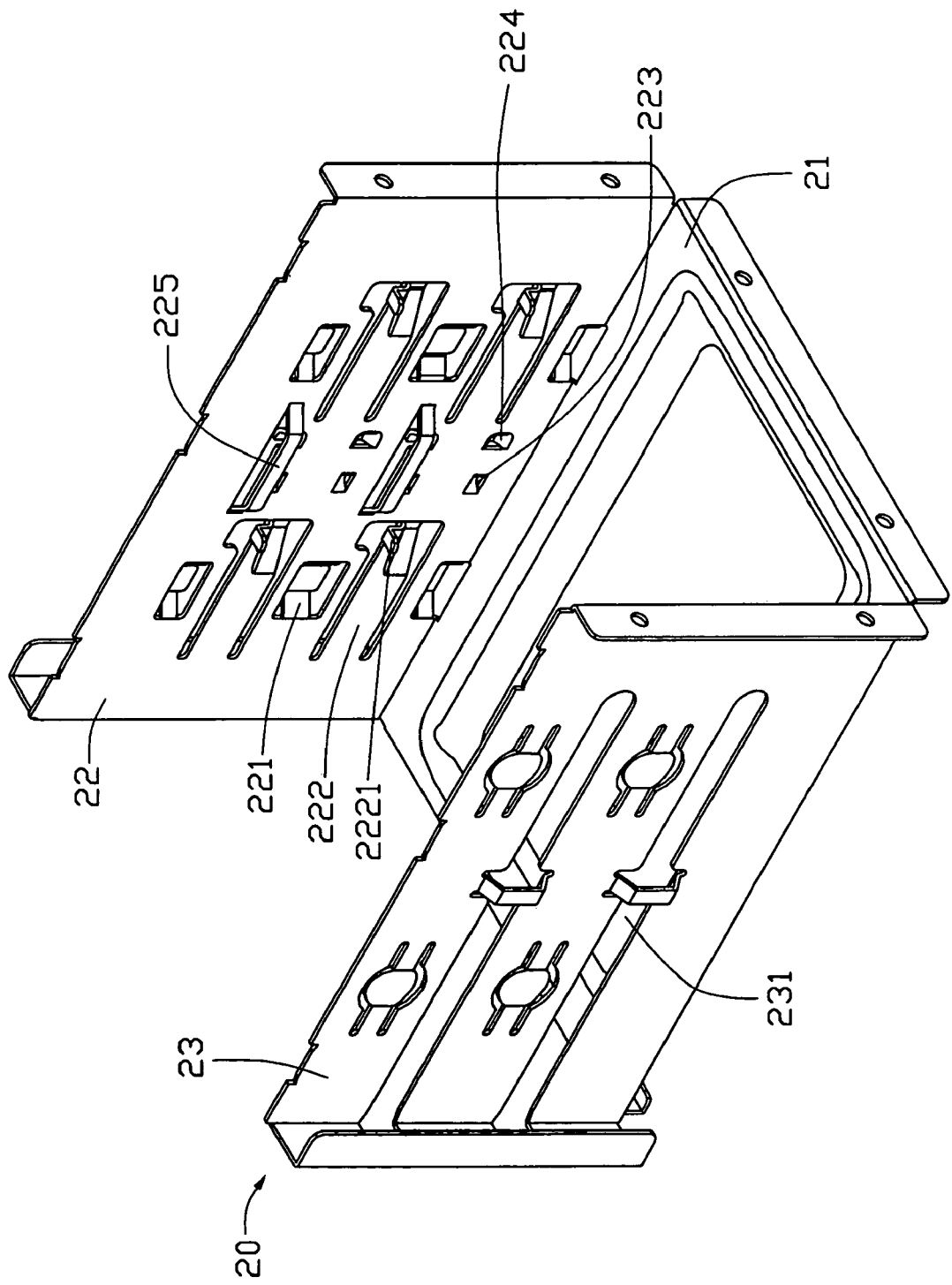
FIG. 2 is an isometric view of the bracket of FIG. 1.
Figure 3:
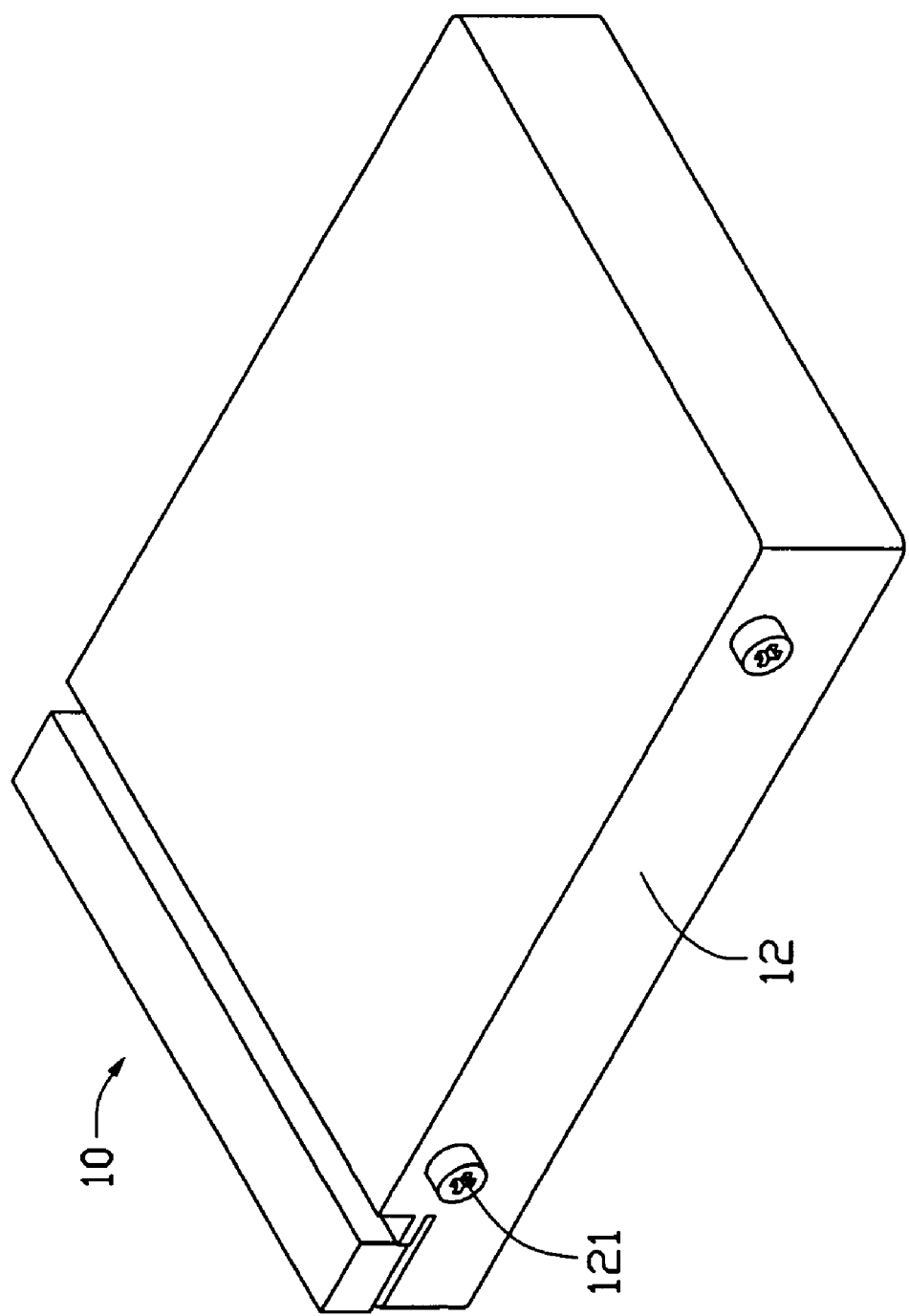
FIG. 3 is an isometric view of the data storage device of FIG. 1.

Referring to FIGS. 1 to 3, a mounting apparatus of an electronic device like a computer in accordance with a preferred embodiment of the present invention includes a bracket 20 for receiving a component of the computer like a data storage device 10 and a locking member 30 disposed on the bracket 20.

The data storage device 10 has a first side wall 11 and a second side wall 12. A plurality of mounting holes 111 used as first engagement means is defined in the first side wall 11. A plurality of screws 121 is secured to the second side wall 12.

The bracket 20 includes a bottom plate 21, a first side plate 22 and a second side plate 23. The first and second side plates 22, 23 extend perpendicularly from opposite edges of the bottom plate 21. A pair of guiding clips 225 is inward formed on the first side plate 22 by stamping. A pair of resilient clips 222 used as second engagement means extends from the first side plate 22 below each guiding clip 225. An operating portion 2222 protrudes outward from a free end of each resilient clip 222. Each operating portion 2222 has a slanted surface 2223, thereby forming a space between the operating portion 2222 and the first side plate 22. A retaining tab 2221 is inward bent from the free end of the resilient clip 222. A pair of bridges 221 is outward formed at both sides of each resilient clip 222 on the first side plate 22. Two protrusions 223 and two blocking tabs 224 protrude outward from the first side plate 22, below each of the guiding clip 225. A plurality of sliding slots 231 is defined in the second side plate 23, corresponding to the resilient clips 222 of the first side plate 22 respectively.

Figure 4:
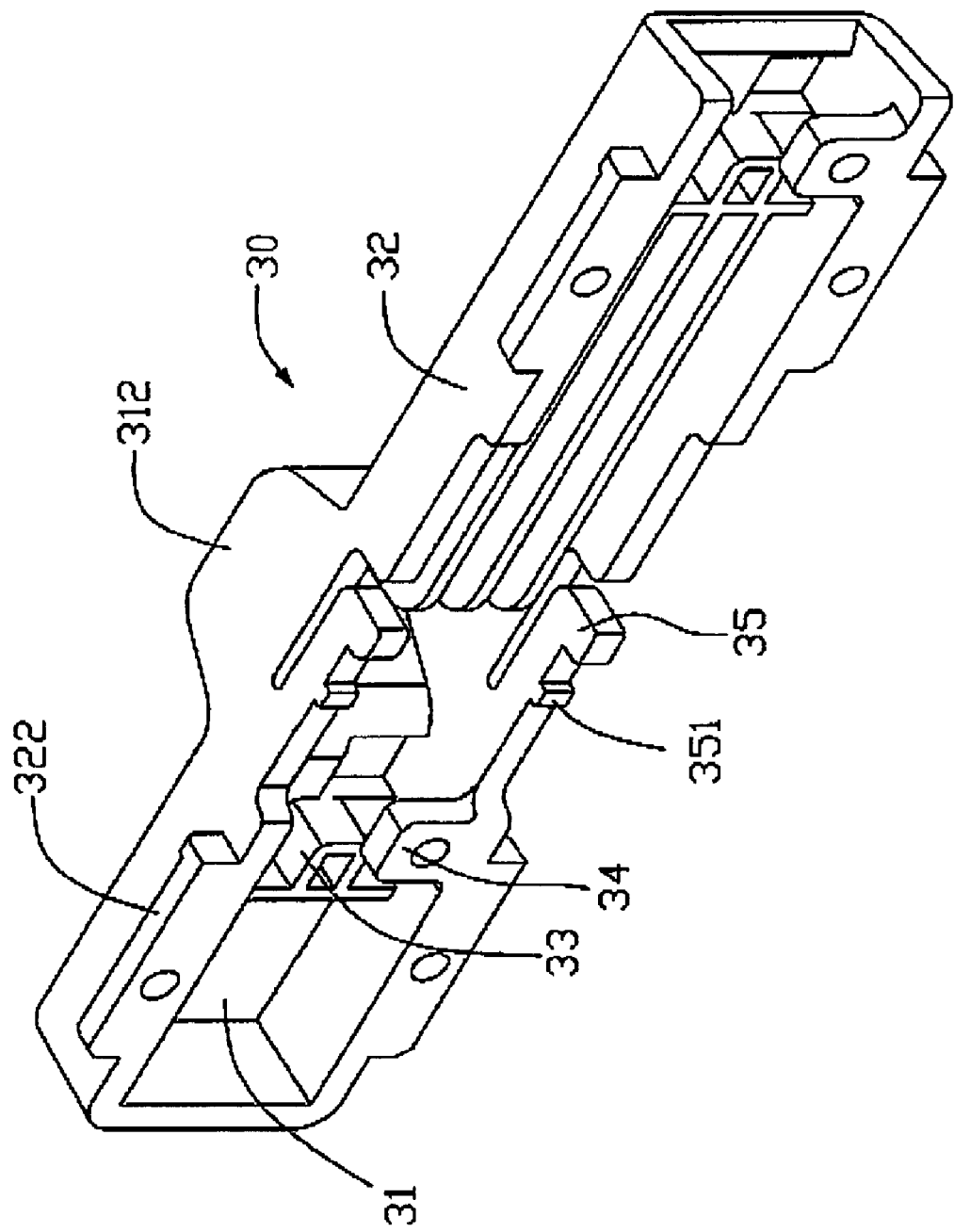
FIG. 4 is an isometric view of the locking member of FIG. 1.

Referring to FIGS. 1 and 4, the locking member 30 includes a rectangular flat 31 and a pair of side walls 32 extend from two longitudinal edges of the flat 31. A protuberance 312 protrudes from a top surface of the flat 31. Two pressing portions 33 are disposed within the locking member 30. A plurality of flanges 322 is disposed along an edge of each side wall 32. The flange 322 has a bent end to confine the over-movement of the locking member 30. Two pushing portions 34 are inward formed on a side wall of the locking member 30. Two L-shaped hooks 35 are disposed on a side wall 32. A protrusion 351 is formed at a free end of the hook 35.

Figure 5:
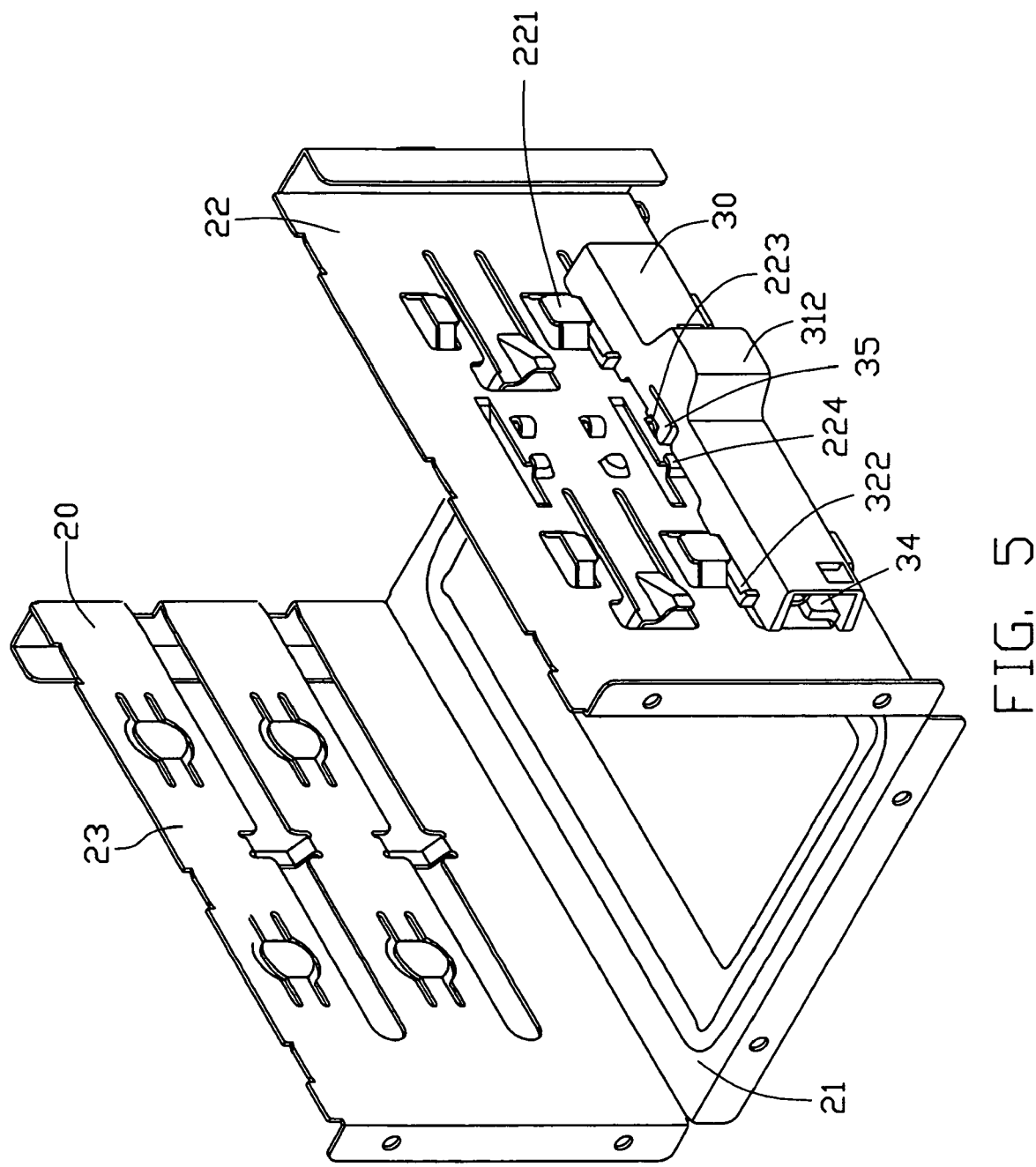
FIG. 5 is a pre-assembled view of FIG. 1, showing the locking member secured to the bracket.

Referring to FIG. 5, the locking member 30 is upper and lower slidably secured to the bracket. The flanges 322 of the locking member 30 lies between the bridges 221 of the first side plate 22. Each pressing portion 33 of the locking member 30 is disposed at a right side of the corresponding operating portion 2222 of the bracket 20. The pushing portions 34 of the locking member 30 are received within an inner side of the operating portions 2222 of the bracket 20 respectively. The hooks 35 abut on the protrusions 223. The slanted surfaces 2223 are pushed by the pushing portions 34, thereby deforming the resilient clips 222 outward.

Figure 6:
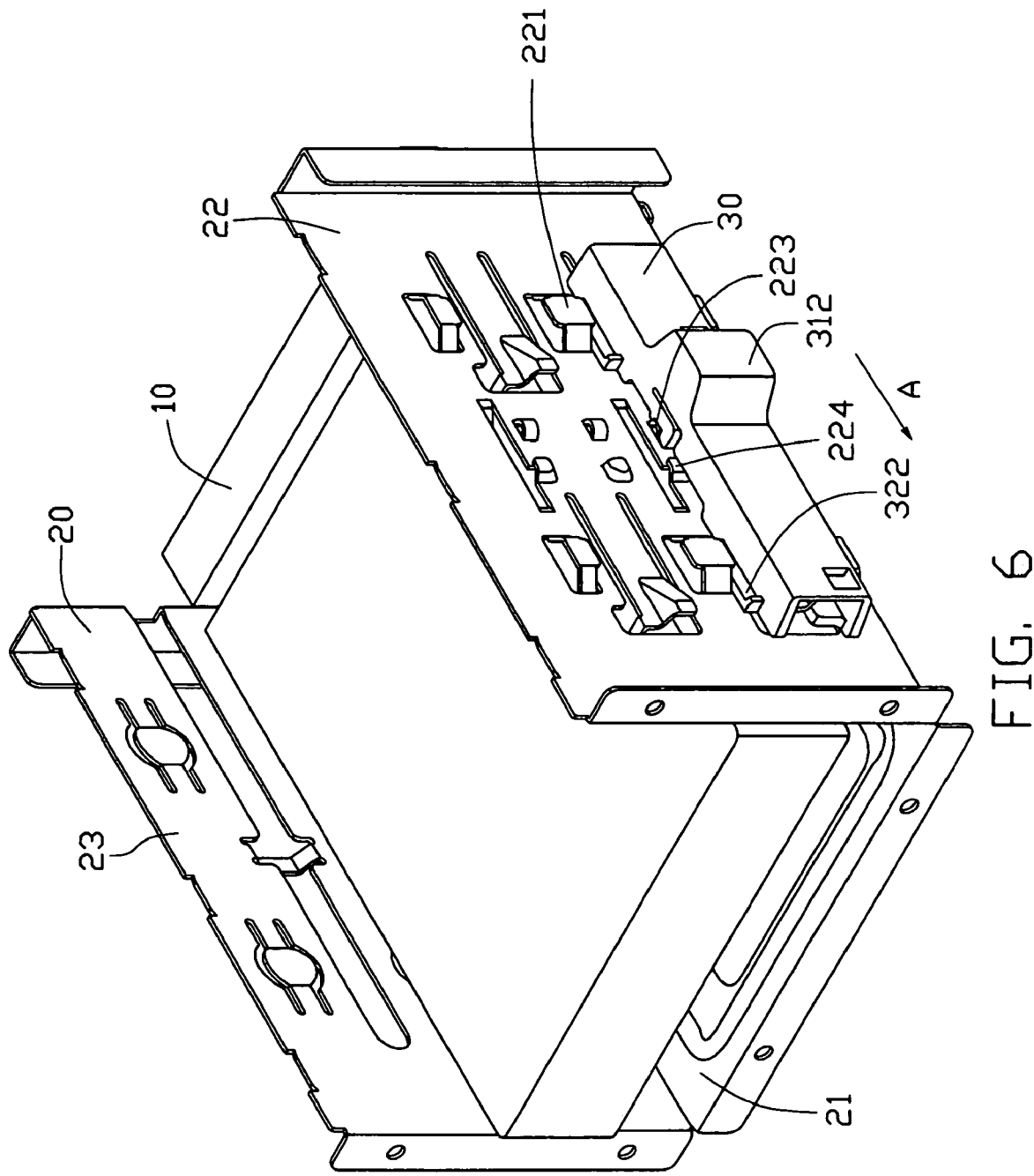
FIG. 6 is similar to FIG. 5, but showing the data storage device slid into the bracket.
Figure 7:
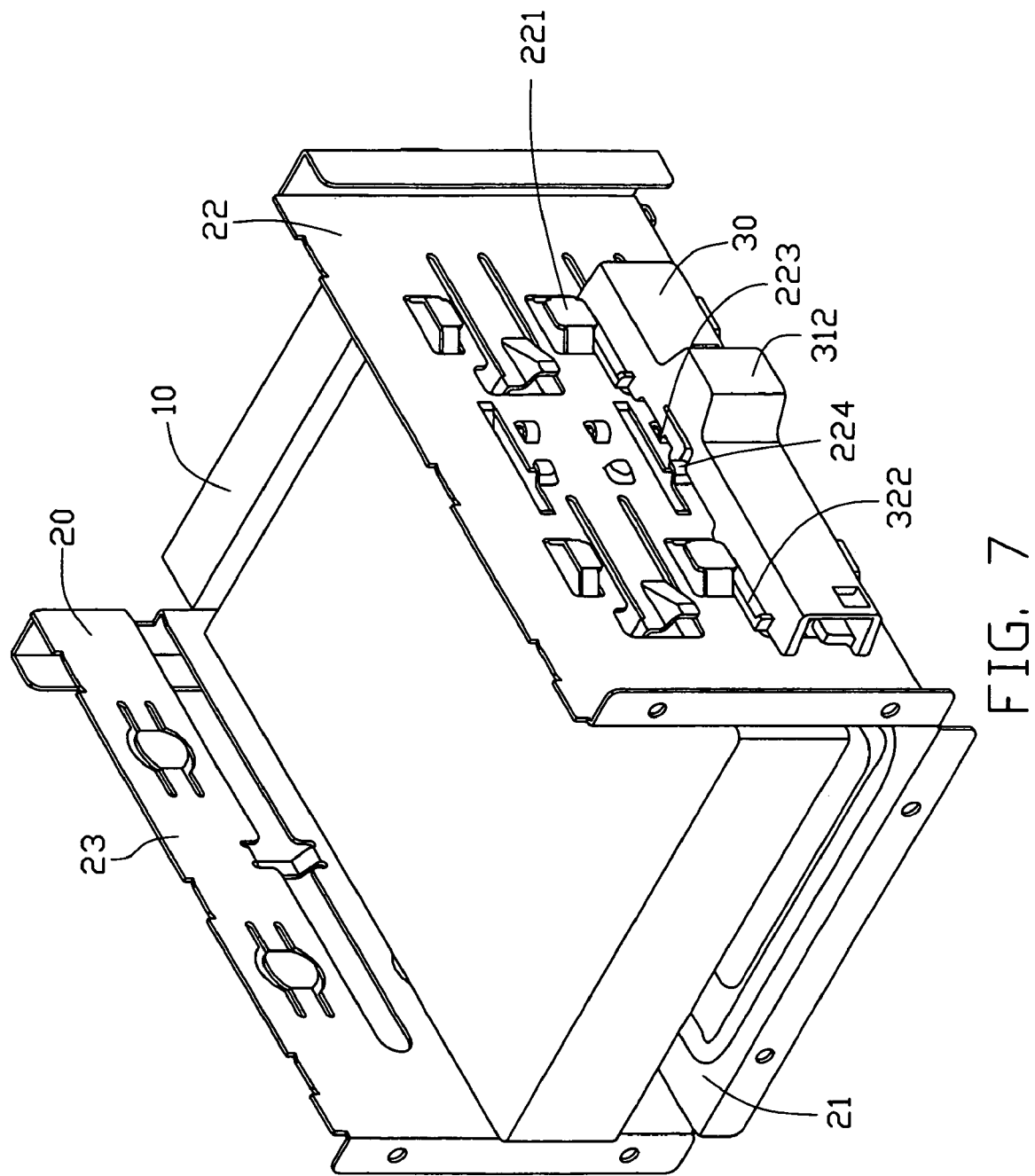
FIG. 7 is an assembled view of FIG. 1.

Referring to FIGS. 6 and 7, in securing the data storage device 10 to the bracket 20, the data storage device 10 is inserted into the bracket 20 along the sliding slots 231 and the guiding clips 225, until the mounting holes 111 of the data storage device 10 align with the corresponding retaining tabs 2221. The protuberance 312 is pushed in the direction of arrow A to slide the locking member 20. The protrusions 351 of the hooks 35 are bent inward by the protrusions 223 and ride over the protrusions 223. The protrusions 351 abut against the left side of the protrusions 223 when the hooks 35 are stopped by the blocking tabs 224. The pushing portions 34 slide out of the operating portions 2222 of the bracket 20 respectively. The pressing portions 33 of the locking member 30 press the resilient clips 222 of the bracket 20 inward respectively. The retaining tabs 2221 of the resilient clips 222 are inserted into the corresponding mounting holes 111 of the data storage device 10. Thus the data storage device 10 is secured to the bracket 20.

In disassembly, the locking member 30 is slid reversely. The pushing portions 34 are respectively inserted into the operating portions 2222 of the bracket 20 again. The retaining tabs 2221 of the resilient clips 222 are lifted outward from the mounting holes 111 of the data storage device 10. The data storage device 10 is ready to be taken out of the bracket 20.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A mounting apparatus for a data storage device with mounting holes defined in a side wall thereof, comprising:
    a bracket for accommodating the data storage device, a resilient clip extending from the bracket, the resilient clip has an operating portion and a retaining tab protruding in opposite directions, the retaining tab adapted for engaging into the mounting hole of the data storage device, a protrusion protruding outward from the bracket and
    a locking member slidably secured to the bracket, the locking member comprising a pushing portion lifting the operating portion, thereby disengaging the retaining tab from the mounting hole of the data storage device, the locking member further comprising a resilient hook, a protrusion formed on the hook, the hook and the protrusion capable of cooperatively engaging the protrusion of the bracket therebetween to restrict a movement of the locking member.

2. The mounting apparatus as described in claim 1, wherein a plurality of flanges is disposed on the locking member.

3. The mounting apparatus as described in claim 2, wherein a plurality of bridges is outward formed on the bracket corresponding to the flanges for guiding the locking member.

4. The mounting apparatus as described in claim 1, wherein the locking member comprises a rectangular flat and a pair of side walls extending from two longitudinal edges of the flat, the pushing portion disposed on a side wall of the locking member.

5. The mounting apparatus as described in claim 4, wherein a pressing portion is disposed on the locking member for urging the retaining tab to engage into the mounting hole of the data storage device while the locking member is slid.

6. The mounting apparatus as described in claim 5, wherein a slanted surface is formed on the operating portion corresponding to the pressing portion.

7. The mounting apparatus as described in claim 1, wherein a blocking tab protrudes outward from the bracket corresponding to the hook of the locking member for limiting over-movement of the locking member.

8. The mounting apparatus as described in claim 1, wherein the bracket has a pair of guiding clips disposed at two sides of the resilient clip for supporting the data storage device.

9. A data storage device mounting assembly, comprising:
    a data storage device with mounting holes defined in a side wall thereof;
    a bracket for accommodating the data storage device, a resilient clip extending from the bracket, the resilient clip has an operating portion and a retaining tab protruding in opposite directions, the retaining tab engaging into the mounting hole of the data storage device, a slanted surface formed on the operating portion and
    a locking member slidably secured to the bracket, the locking member comprising a pressing portion sliding along the slanted surface from an outer side of the slanted surface for engaging the retaining tab into the mounting hole of the data storage device and a pushing portion lifting the operating portion by abutting against the slanted surface from an inner side of the slanted surface, wherein the inner side of the slanted surface is opposite to the outer side of the slanted surface.

10. The data storage device mounting assembly as described in claim 9, wherein the locking member comprises a rectangular flat and a pair of side walls extending from two longitudinal edges of the flat, the pushing portion disposed on a side wall of the locking member.

11. The data storage device mounting assembly as described in claim 9, wherein a plurality of flanges is disposed on the locking member.

12. The data storage device mounting assembly as described in claim 11, wherein a plurality of bridges is outward formed on the bracket corresponding to the flanges for guiding the locking member.

13. The data storage device mounting assembly as described in claim 9, wherein the locking member comprises a resilient hook at a bottom of the locking member.

14. The data storage device mounting assembly as described in claim 13, wherein a protrusion and a blocking tab protrude outward from the bracket corresponding to the hook of the locking member for limiting movement of the locking member.

15. An electronic device comprising:
    a separable component comprising at least one first engagement means formed at a side wall thereof;
    a bracket installed in said electronic device for accommodating said component therein, a second engagement means corresponding to each of said at least one first engagement means integrally formed at a side plate of said bracket and movable toward said each of said at least one first engagement means to engage therewith in order for positioning said component in said bracket when said component is received in said bracket;
    a locking member movably attachable to said side plate of said bracket, said locking member capable of moving parallel to said side plate so as to drive said second engagement means to disengage from said each of said at least one first engagement means and inversely moving parallel to said side plate so as to urge said second engagement means to engage with said each of said at least one first engagement means for said positioning of said component and
    wherein said locking member further comprising a resilient hook and a protrusion formed on said hook, said hook and said protrusion are capable of cooperatively engaging a protrusion of said bracket to restrict movement of said locking member.

16. The electronic device as described in claim 15, wherein said second engagement means is a resilient clip integrally extending along said side plate of said bracket and having an operating portion and a retaining tab protruding in opposite directions.

17. The electronic device as described in claim 15, wherein at least one pushing portion and at least one pressing portion are integrally formed in said locking member so as to respectively drive disengagement and urge engagement of said second engagement means.

18. The electronic device as described in claim 17, wherein said second engagement means comprises a slanted operating portion, said at least one pressing portion of said locking member slides along an outer side of said slanted operating portion in order to urge engagement of said second engagement means, and said at least one pushing portion of said locking member abuts against an inner side of said slanted operating portion opposite to said outer side in order to drive disengagement of said second engagement means.

* * * * *